(12) United States Patent
Russell et al.

(10) Patent No.: US 11,845,645 B2
(45) Date of Patent: Dec. 19, 2023

(54) CHEMICAL MIXTURE DISPENSING ASSEMBLY

(71) Applicants: Jeffrey Russell, Lancaster, CA (US); John Russell, Lancaster, CA (US); Jo Ann Franklin, Palmdale, CA (US)

(72) Inventors: Jeffrey Russell, Lancaster, CA (US); John Russell, Lancaster, CA (US); Jo Ann Franklin, Palmdale, CA (US)

(*) Notice: Subject to any disclaimer, the term of this patent is extended or adjusted under 35 U.S.C. 154(b) by 783 days.

(21) Appl. No.: 16/996,402

(22) Filed: Aug. 18, 2020

(65) Prior Publication Data
US 2022/0055886 A1  Feb. 24, 2022

(51) Int. Cl.
*B01F 25/00* (2022.01)
*B01F 23/451* (2022.01)
*E04H 4/12* (2006.01)
*B67D 3/00* (2006.01)

(52) U.S. Cl.
CPC .......... *B67D 3/0016* (2013.01); *B01F 23/451* (2022.01); *B01F 25/1051* (2022.01); *B67D 3/0003* (2013.01); *B67D 3/0041* (2013.01); *B67D 3/0077* (2013.01); *E04H 4/1281* (2013.01)

(58) Field of Classification Search
CPC .. B67D 3/0016; B67D 3/0003; B67D 3/0041; B67D 3/0077; B67D 2210/0006; B67D 2210/00099; B67D 7/744; B01F 23/451; B01F 25/1051; E04H 4/1281; G05D 11/133
USPC .......................................................... 422/105
See application file for complete search history.

(56) References Cited

U.S. PATENT DOCUMENTS

| 5,425,404 | A | 6/1995 | Dyer |
| 5,597,019 | A | 1/1997 | Thomas |
| 5,607,651 | A * | 3/1997 | Thomas ............... B01F 21/30 422/278 |
| 5,715,877 | A | 2/1998 | Sandor |
| 6,283,330 | B1 | 9/2001 | Gillespie |
| D552,394 | S | 10/2007 | Vanlane |
| 7,291,261 | B1 * | 11/2007 | Rhodes ............... E04H 4/1281 422/261 |
| 9,700,854 | B2 | 7/2017 | Olson |

FOREIGN PATENT DOCUMENTS

WO  WO1999028045  6/1999

* cited by examiner

*Primary Examiner* — Huy Tram Nguyen

(57) ABSTRACT

A chemical mixture dispensing assembly for automatically filling a fluid containment with a predetermined ratio of chemicals and water includes a housing that is mountable on a support surface such that the housing is positioned proximate a fluid containment. The housing is fluid coupled to a water source, a first chemical source and a second chemical source. A mixing unit is positioned in the housing and the mixing unit mixes a predetermined volume of fluid from the first chemical source and the second chemical source with a predetermined volume of water from the water source to produce a fluid mixture. The mixing unit dispenses a predetermined volume of the fluid mixture from the mixture outlet to fill the fluid containment with the fluid mixture.

14 Claims, 9 Drawing Sheets

CHEMICAL MIXTURE DISPENSING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to chemical dispensing devices and more particularly pertains to a new chemical dispensing device for automatically filling a fluid containment with a predetermined ratio of chemicals and water.

(2) Description of Related Art Including Information Disclosed Under 37 CFR 1.97 and 1.98

The prior art relates to chemical dispensing devices including a fluid mixing device that insertably receives a fluid bottle for mixing the contents of the fluid bottle with water. The prior art discloses a fluid dilution device for diluting concentrated liquid solutions into a fluid bottle. The prior art discloses a fluid mixture device that includes a plurality of funnels each aligned with a respective opening in a housing. The prior art also discloses a dispensing assembly for dispensing a constant volume of fluid from a bottle regardless of the level of fluid in the bottle. The prior art discloses a fluid mixing device that mixes a chemical solution based on a weight of a subsequent fluid mixture.

BRIEF SUMMARY OF THE INVENTION

An embodiment of the disclosure meets the needs presented above by generally comprising a housing that is mountable on a support surface such that the housing is positioned proximate a fluid containment. The housing is fluid coupled to a water source, a first chemical source and a second chemical source. A mixing unit is positioned in the housing and the mixing unit mixes a predetermined volume of fluid from the first chemical source and the second chemical source with a predetermined volume of water from the water source to produce a fluid mixture. The mixing unit dispenses a predetermined volume of the fluid mixture from the mixture outlet to fill the fluid containment with the fluid mixture.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
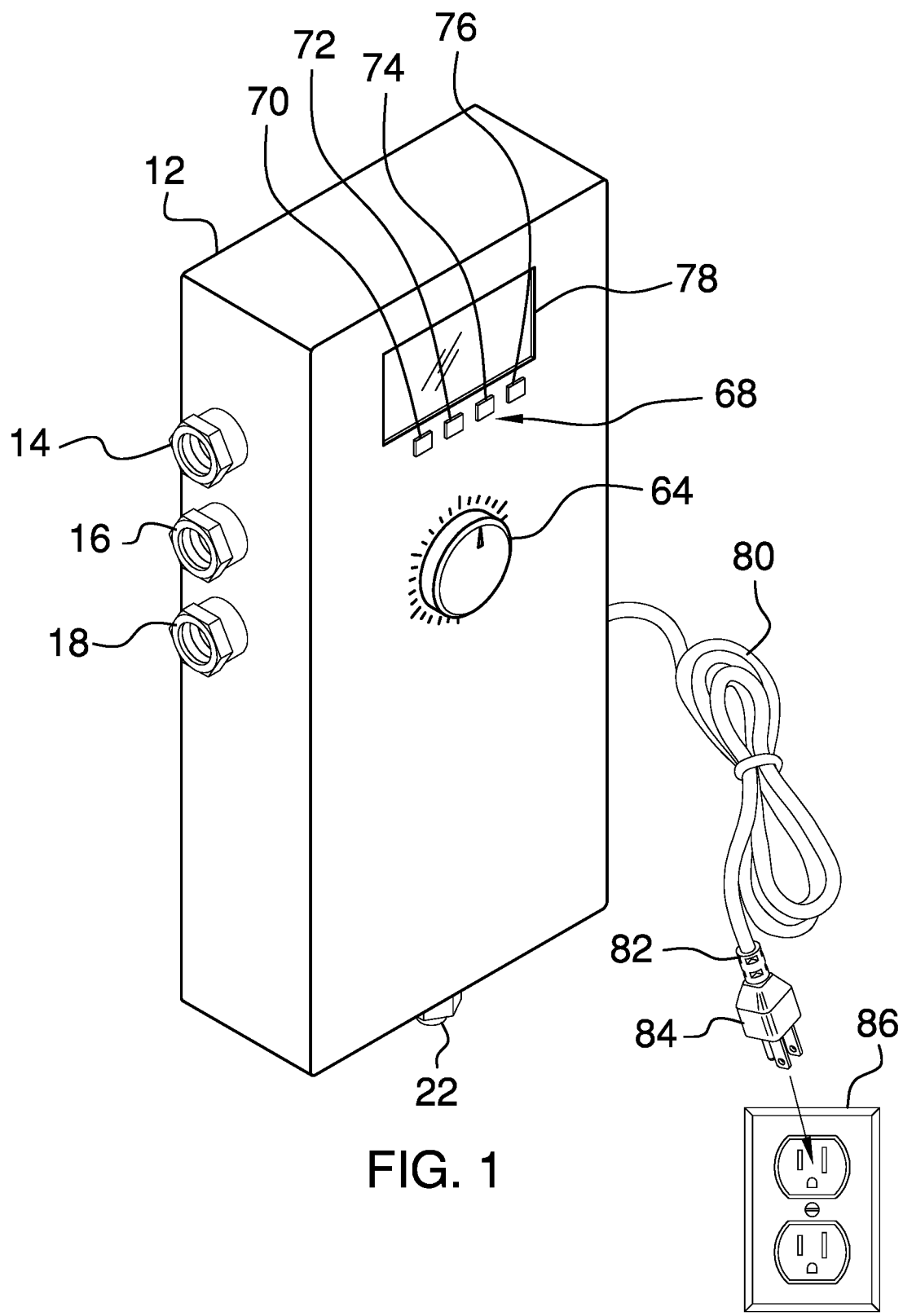
FIG. 1 is a perspective view of a chemical mixture dispensing assembly according to an embodiment of the disclosure.
Figure 2:
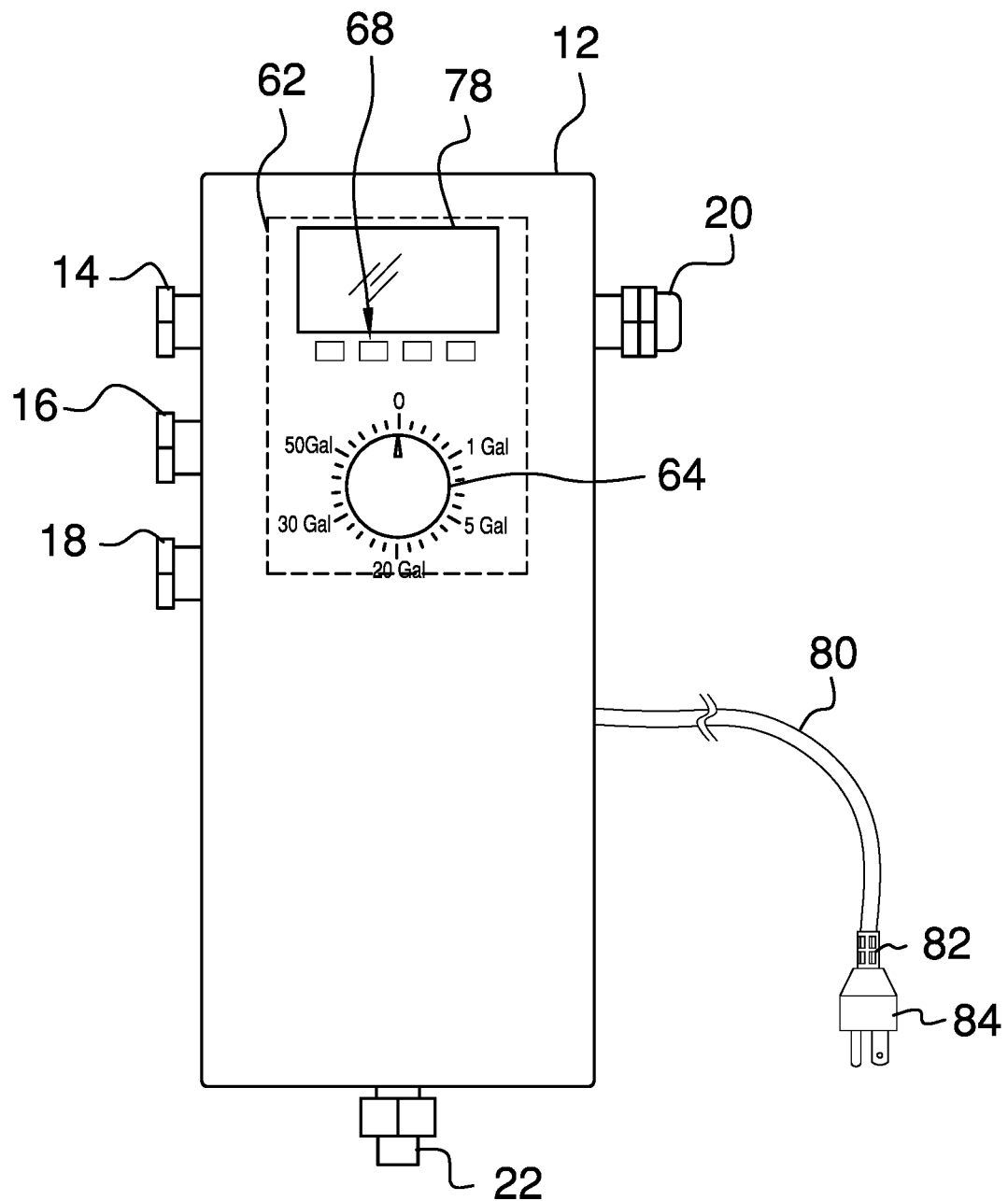
FIG. 2 is a front phantom view of an embodiment of the disclosure.
Figure 3:
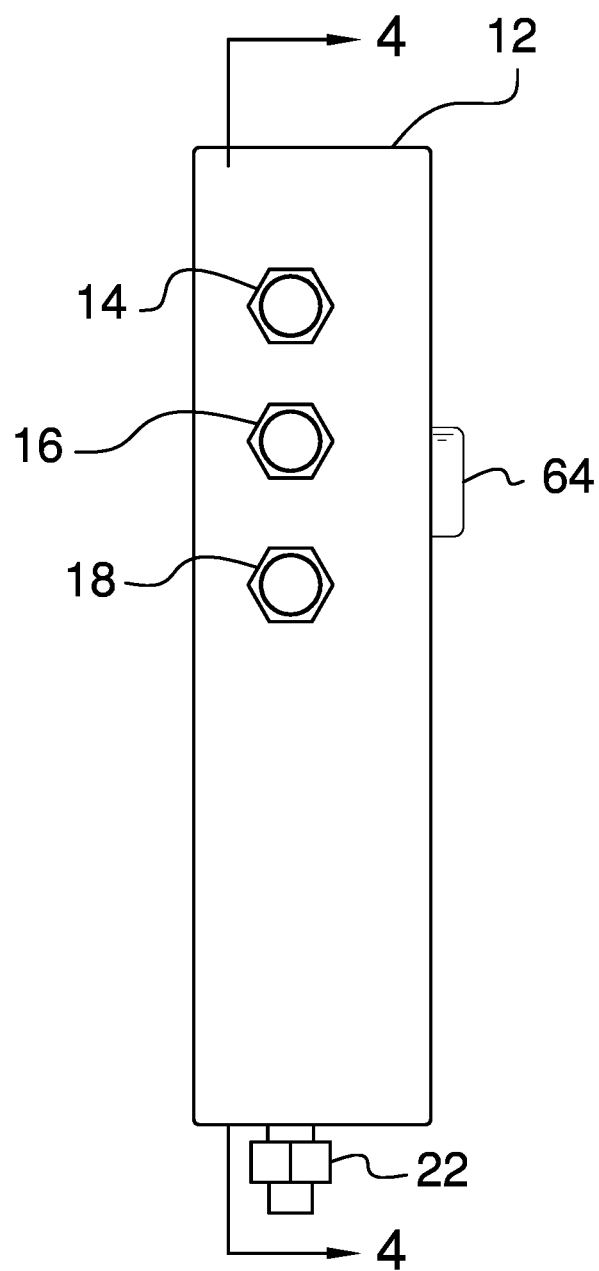
FIG. 3 is a left side view of an embodiment of the disclosure.
Figure 4:
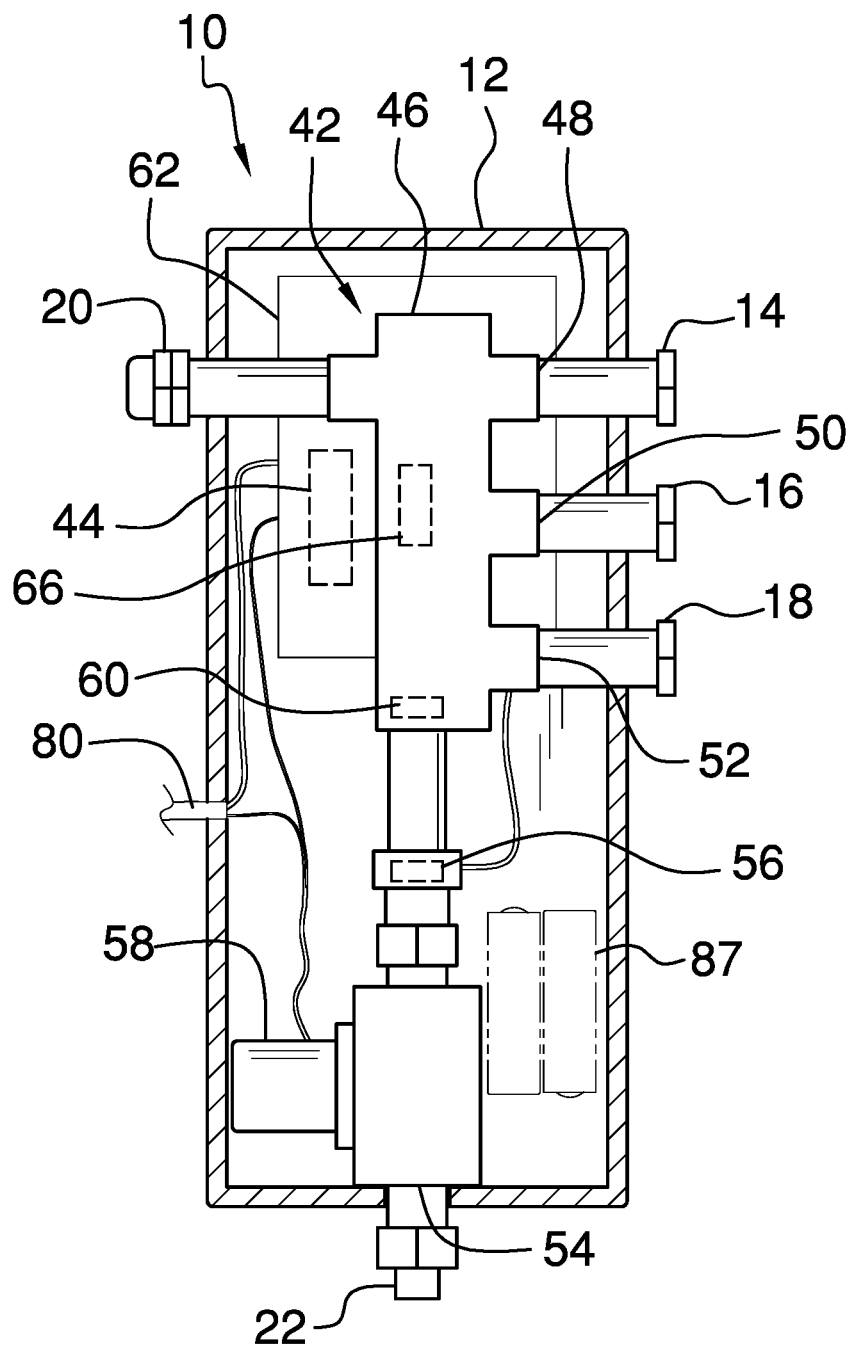
FIG. 4 is a cross sectional view taken along line 4-4 of FIG. 3 of an embodiment of the disclosure.

With reference now to the drawings, and in particular to FIGS. 1 through 9 thereof, a new chemical dispensing device embodying the principles and concepts of an embodiment of the disclosure and generally designated by the reference numeral 10 will be described.

As best illustrated in FIGS. 1 through 9, the chemical mixture dispensing assembly 10 generally comprises a housing 12 that has a water inlet 14, a first chemical inlet 16, a second chemical inlet 18, a water outlet 20 and a mixture outlet 22. The housing 12 is mountable on a support surface 24 such that the housing 12 is positioned proximate a fluid containment 26. The fluid containment 26 may be a sink in a restaurant kitchen, a swimming pool or any other fluid containment that contains a mixture of water and selected chemicals.

A water hose 28 is fluidly coupled between the water inlet 14 and a water source 30 to deliver water to the housing 12. A first chemical hose 32 is fluidly coupled between the first chemical inlet 16 and a first chemical source 34 to deliver a first chemical to the housing 12. A second chemical hose 36 is fluidly coupled between the second chemical inlet 18 and a second chemical source 38 to deliver a second chemical to the housing 12. Each of the first chemical source 34 and the second chemical source 38 may be a bottle of chemicals, such as chlorine, an anti-bacterial or any other chemical commonly employed to treat water. A mixture hose 40 is fluidly coupled between the mixture outlet 22 and the fluid containment 26 to deliver a fluid mixture to the fluid containment 26. The fluid mixture is a mixture of water, the first chemical and the second chemical.

A mixing unit 42 is provided and the mixing unit 42 is positioned in the housing 12. The mixing unit 42 is in fluid communication with the water inlet 14, the first chemical inlet 16 and the second chemical inlet 18. In this way the mixing unit 42 receives the water, the first chemical and the second chemical. Additionally, the mixing unit 42 is in fluid communication with the mixture outlet 22. The mixing unit 42 mixes a predetermined volume of fluid from the first chemical inlet 16 and the second chemical inlet 18 with a predetermined volume of water from the water inlet 14 to produce the fluid mixture. Moreover, the mixing unit 42 dispenses a predetermined volume of the fluid mixture from the mixture outlet 22. In this way the mixing unit 42 can fill the fluid containment 26 with the fluid mixture, of a predetermined ratio, without overflowing the fluid containment 26. The mixing unit 42 might only mix a single chemical with the water or the mixing unit 42 might mix a plurality of chemicals with the water, depending on a user's preference.

The mixing unit 42 comprises a control circuit 44 that is positioned within the housing 12. The control circuit 44 receives a dispense input and the control circuit 44 receives a shut off input. The mixing unit 42 includes a mixture valve 46 that is positioned within the housing 12 and the mixture valve 46 is electrically coupled to the control circuit 44. The mixture valve 46 has a water input 48, a first chemical input 50, a second chemical input 52 and a mixture output 54. The mixture valve 46 may comprise an electronically controlled throttle body, or other similar electronic mixing device, that can modulate fluid input volumes from a variety of fluid sources.

The water input 48 is fluidly coupled to the water inlet 14 on the housing 12 to receive the water. The first chemical input 50 is fluidly coupled to the first chemical inlet 16 to receive the first chemical. The second chemical input 52 is fluidly coupled to the second chemical inlet 18 to receive the second chemical. The mixture output 54 is in fluid communication with each of the water input 48, the first chemical input 50 and the second chemical input 52. In this way the mixture output 54 receives the fluid mixture thereby facilitating the fluid mixture to be dispensed from the mixture outlet 22.

The mixing unit 42 includes a flow sensor 56 that is integrated into the mixture valve 46. The flow sensor 56 is electrically coupled to the control circuit 44 and the flow sensor 56 is aligned with the mixture output 54. In this way the flow sensor 56 can sense the flow rate of the fluid mixture through the mixture output 54. Moreover, the control circuit 44 receives the shut off input when the flow sensor 56 senses that a pre-determined volume of the fluid mixture has flowed through the mixture output 54. The flow sensor 56 may comprise an electronic fluid flow sensor of any conventional design.

The mixing unit 42 includes a flow control valve 58 that is coupled to the mixture valve 46 and the flow control valve 58 is in fluid communication with the mixture output 54. Additionally, the flow control valve 58 is electrically coupled to the control circuit 44. The flow control valve 58 modulates the volume of the fluid mixture released from the mixture output 54 based on data from the flow sensor 56. The flow control valve 58 is actuated into an open condition when the control circuit 44 receives the dispense input to release the fluid mixture through the mixture output 54. Conversely, the flow control valve 58 is actuated into a closed condition when the control circuit 44 receives the shut off input to inhibit the fluid mixture from flowing through the mixture output 54. The flow control valve 58 may be an electronically controlled fluid valve of any conventional design.

The mixing unit 42 includes a thermostat 60 that is integrated into the mixture valve 46 to sense the temperature of the fluid mixture. The thermostat 60 is electrically coupled to the control circuit 44 and the control circuit 44 adjusts the mixture of hot water and cold water from the water source to maintain a predetermined temperature desired for the fluid mixture. The thermostat 60 may comprise an electronic temperature sensor or the like.

A control unit 62 is coupled to the housing 12 and the control unit 62 is in electrical communication with the mixing unit 42. The control unit 62 is manipulated by a user for determining the volume of the first chemical, the second chemical and the water. Moreover, the mixing unit 42 is actuated to mix the first chemical, the second chemical and the water according to the volume determined with the control unit 62.

The control unit 62 comprises a dial 64 that is rotatably coupled to the housing 12 such that the dial 64 is accessible to the user. The dial 64 is electrically coupled to the control circuit 44 and the dial 64 is rotatable between a minimum volume and a maximum volume. The flow control valve 58 adjusts the total volume of the fluid mixture in accordance with the setting of the dial 64. The control unit 62 includes an electronic timer 66 that is positioned in the housing 12. The electronic timer 66 is electrically coupled to the control circuit 44 and the electronic timer 66 counts down a predetermined duration of time. The control circuit 44 receives the dispense input when the electronic timer 66 counts down the predetermined duration of time.

The control unit 62 includes a plurality of control buttons 68 that is each movably coupled to the housing 12 such that each of the control buttons 68 is accessible to the user. Each of the control buttons 68 is electrically coupled to the control circuit 44. The plurality of control buttons 68 includes a time button 70, a flow amount button 72, a mixture balance button 74 and a temperature button 76. The time button 70 adjusts the duration of time counted down by the electronic timer 66. The flow amount button 72 adjusts the flow rate facilitated by the flow control valve 58. The mixture balance button 74 adjusts a ratio of the first chemical, the second chemical and the water. The temperature button 76 adjusts the desired temperature of the fluid mixture.

The control unit 62 includes a display 78 that is coupled to the housing 12 such that the display 78 is visible to the user. The display 78 is electrically coupled to the control circuit 44 and the display 78 displays indicia comprising operational parameters set by each of the control buttons 68. The display 78 may display the temperature of the fluid mixture sensed by the thermostat 60. The user can adjust the temperature of the fluid mixture at the water source 30, by adjusting hot and cold faucets, in order to achieve a desired temperature of the fluid mixture. Additionally, the mixture valve 46 might add the first chemical and the second chemical to the water when the water reaches a pre-determined temperature. A power cord 80 is coupled to and extends away from the housing 12 and the power cord 80 is electrically coupled to the control circuit 44. The power cord 80 has a distal end 82 with respect to the housing 12 and a male plug 84 is electrically coupled to the distal end 82. The male plug 84 is pluggable into a power source 86 comprising a female electrical outlet. At least one battery 87 may be positioned in the housing and the at least one battery 87 may be electrically coupled to the control circuit 44 for supplying electrical power in lieu of the power cord 80.

Figure 5:
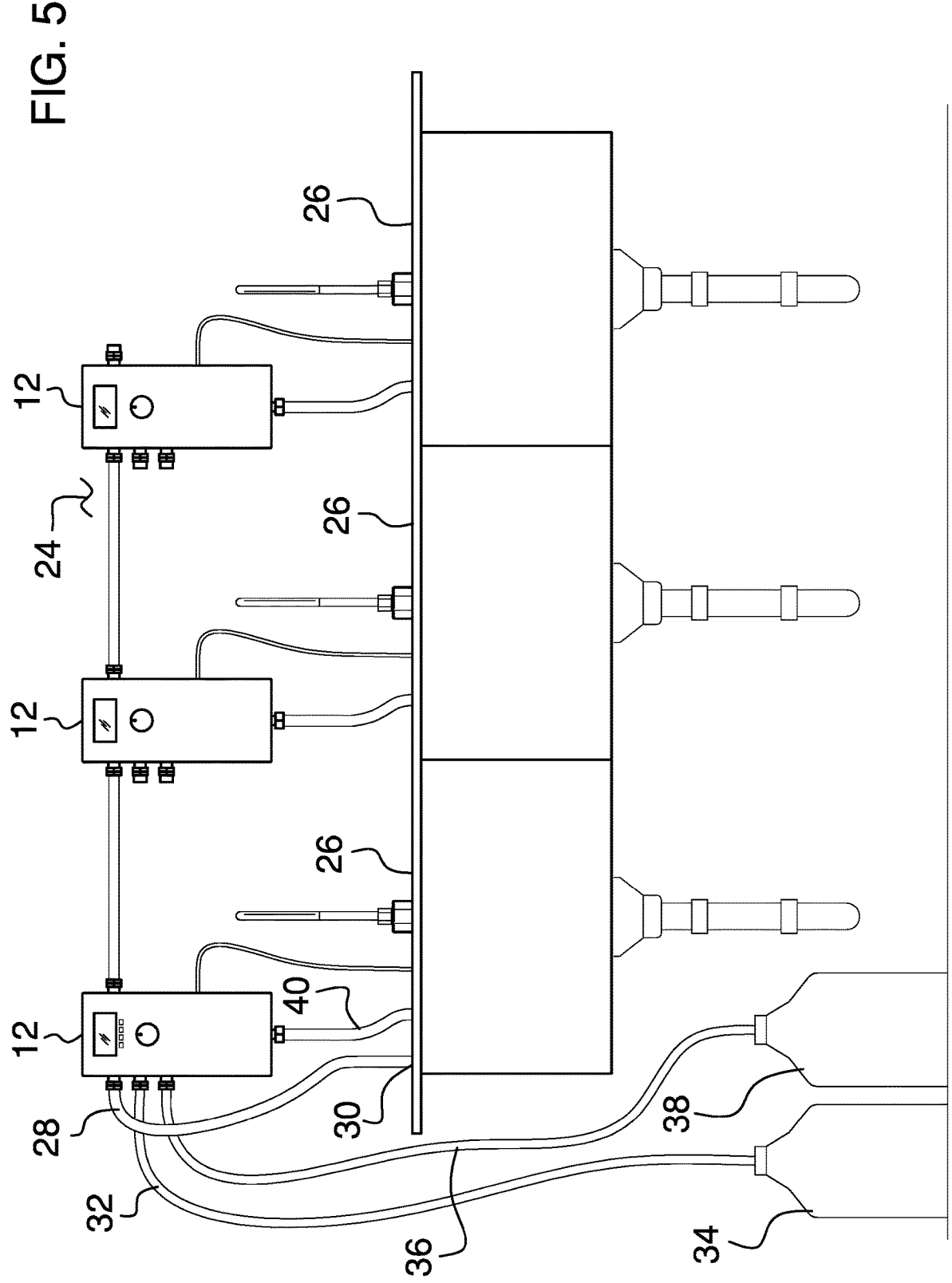
FIG. 5 is a perspective in-use view of a plurality of mixing units servicing a plurality of fluid containments an embodiment of the disclosure.
Figure 6:
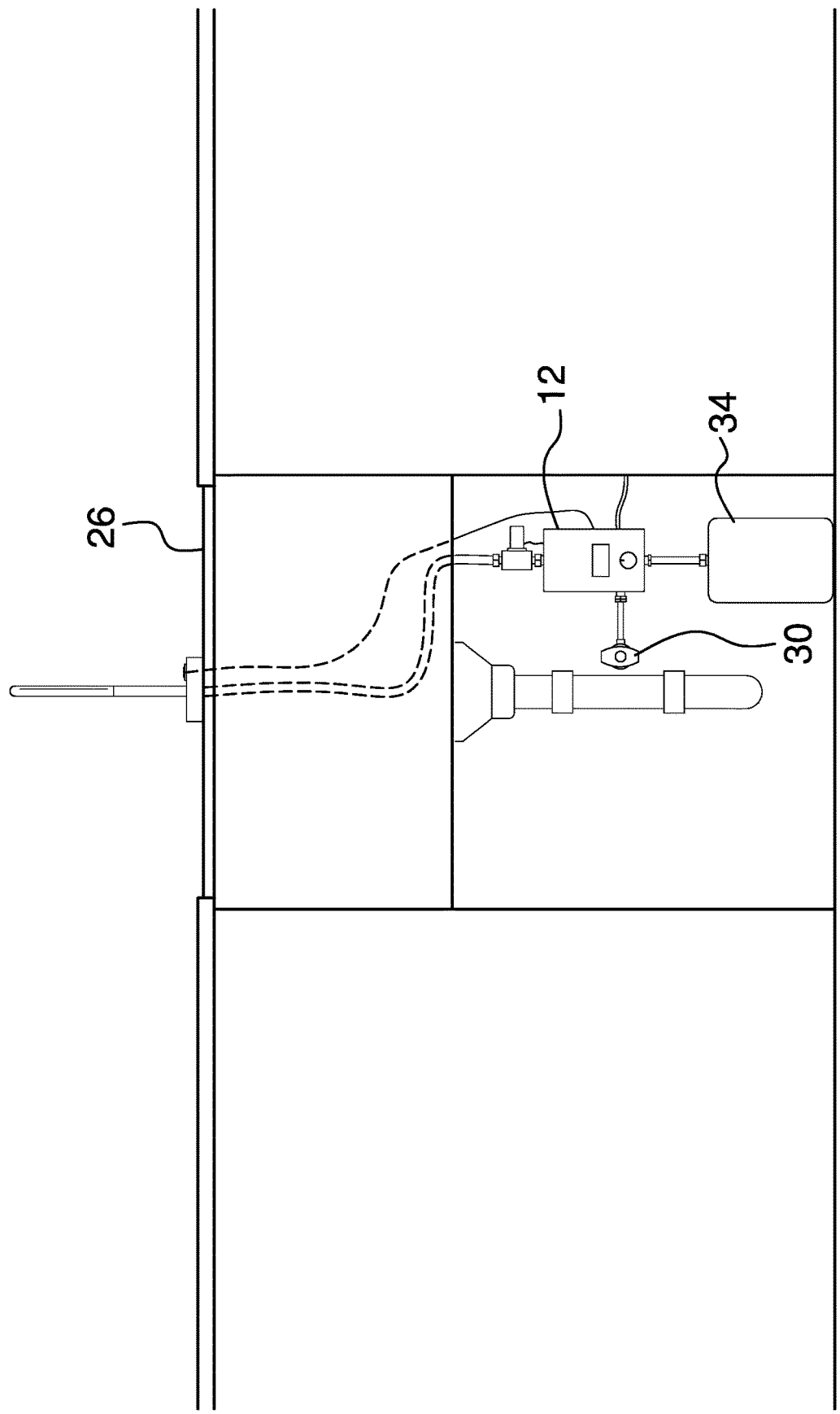
FIG. 6 is a perspective in-use view of an embodiment of the disclosure showing a housing positioned beneath a fluid containment.
Figure 7:
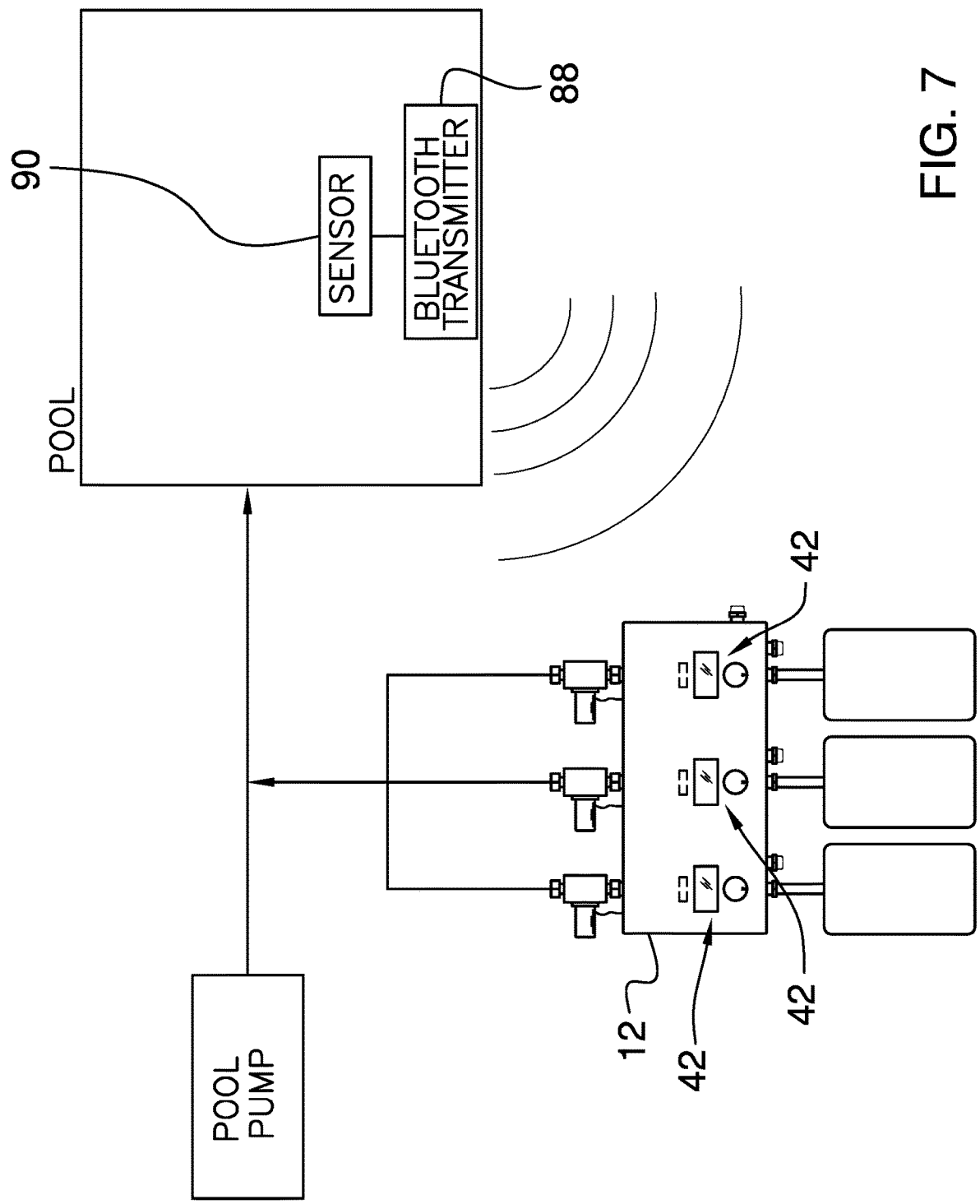
FIG. 7 is a perspective in-use view of an embodiment of the disclosure showing a plurality of mixing units servicing a swimming pool.
Figure 8:
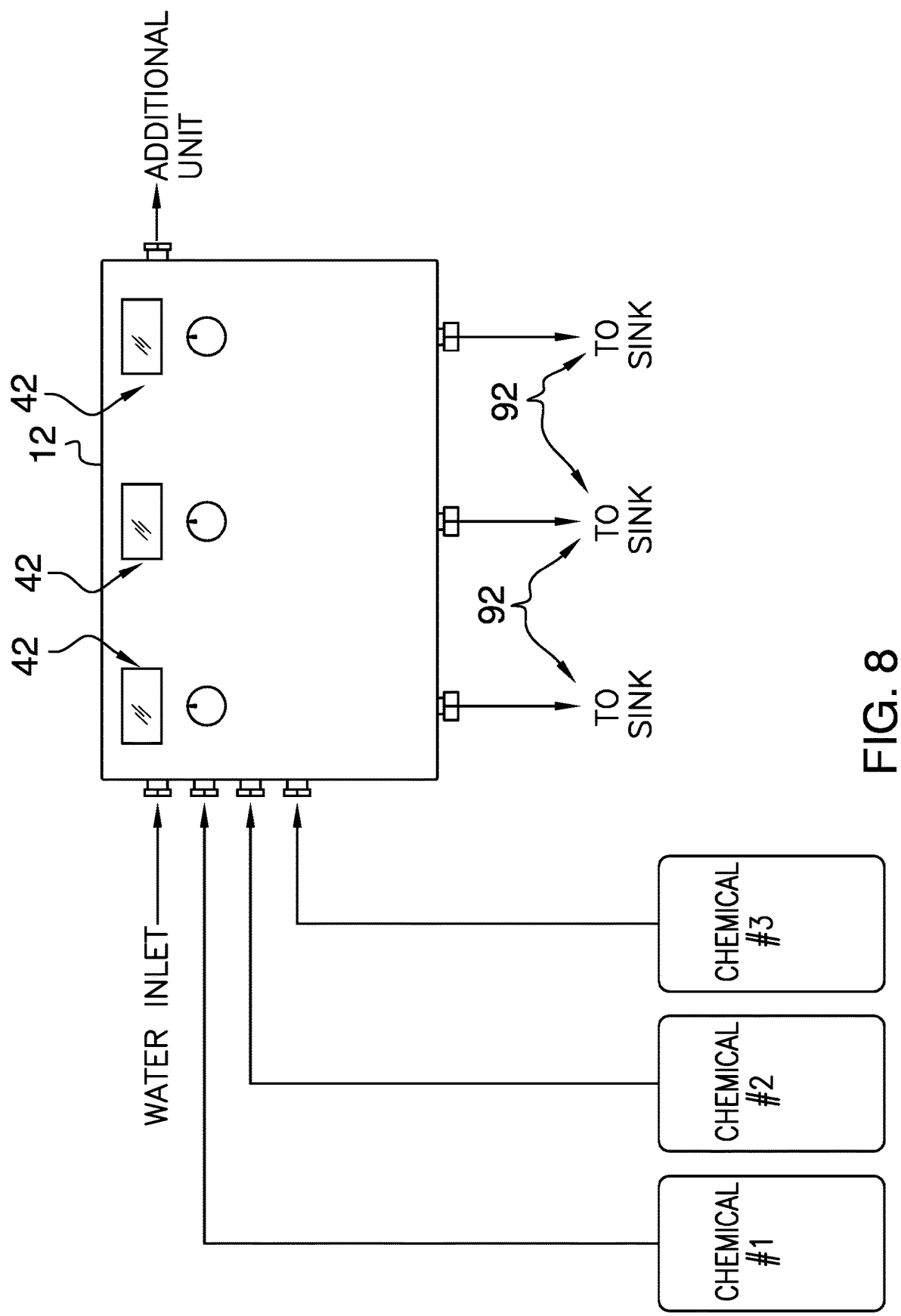
FIG. 8 is a perspective view of an embodiment of the disclosure showing a plurality of mixing units in a single housing.
Figure 9:
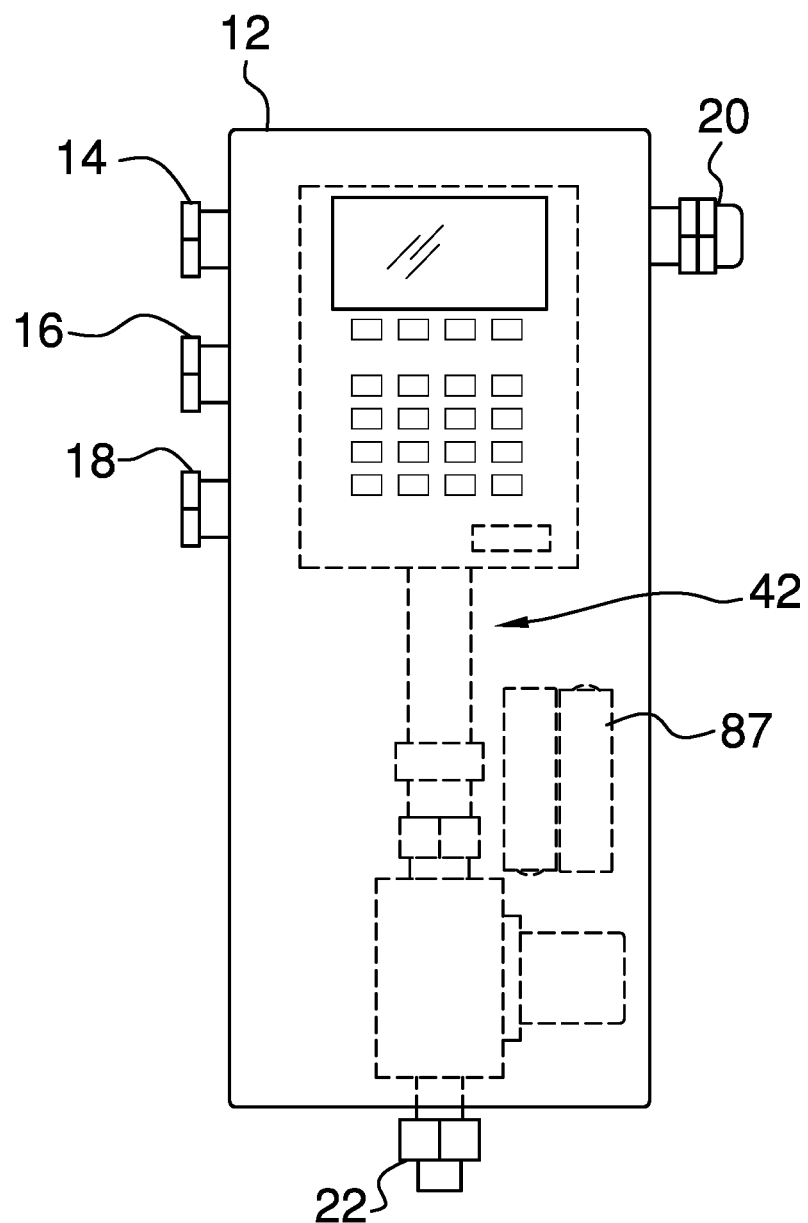
FIG. 9 is a front phantom view of an embodiment of the disclosure.

As is most clearly shown in FIG. 5, a plurality of housings 12 may be fluidly coupled together, with the water input 48 of each housing 12 being fluidly coupled to the water outlet 20 of an adjacent housing 12 for servicing a plurality of fluid containments 26. As is most clearly shown in FIG. 6, the housing 12 may be positioned beneath the fluid containment 26. As is most clearly shown in FIG. 7, a plurality of the mixing units 42 and control units 62 may be integrated into a single housing 12 thereby facilitating a plurality of chemicals to be mixed together for servicing a swimming pool. Additionally, a transceiver 88 may be included to facilitate wireless communication between a sensor 90 in the swimming pool and the plurality of mixing units 42 for controlling the ratio of chemicals and the duration of the dispensing action. As is most clearly shown in FIG. 8, a plurality of mixing units 42 and control units 62 may be integrated into a single housing 12 for servicing a plurality of sinks 92.

In use, the control buttons 68 are manipulated to program the ratio of chemicals, the time between dispensing actions, and the threshold temperature. The dial 64 is rotated to the desired fluid volume of the fluid mixture to be dispensed. In this way each of the chemicals is automatically mixed with the water in the predetermined ratio at the predetermined volume. Thus, sinks in a restaurant, for example, can be automatically filled with washing water and rinsing water without overflowing the sinks. Additionally, the mixing unit 42 and the control unit 62 can be adapted for a variety of fluid mixture dispensing operations. The fluid mixture may be With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:
1. A chemical mixture dispensing assembly for mixing a chemicals and water in a pre-determined ratio and dispensing a pre-determined volume of the mixture, said assembly comprising:
   a housing having a water inlet, a first chemical inlet, a second chemical inlet, a water outlet and a mixture outlet, said housing being mountable on a support surface such that said housing is positioned proximate a fluid containment;
   a water hose being fluidly coupled between said water inlet and a water source wherein said water hose is configured to deliver water to said housing;
   a first chemical hose being fluidly coupled between said first chemical inlet and a first chemical source wherein said first chemical hose is configured to deliver a first chemical to said housing;
   a second chemical hose being fluidly coupled between said second chemical inlet and a second chemical source wherein said second chemical hose is configured to deliver a second chemical to said housing;
   a mixture hose being fluidly coupled between said mixture outlet and the fluid containment wherein said mixture hose is configured to deliver a fluid mixture to the fluid containment;
   a mixing unit being positioned in said housing, said mixing unit being in fluid communication with said water inlet, said first chemical inlet and said second chemical inlet wherein said mixing unit is configured to receive the water, the first chemical and the second chemical, said mixing unit being in fluid communication with said mixture outlet, said mixing unit mixing a predetermined volume of fluid from said first chemical inlet and said second chemical inlet with a predetermined volume of water from said water inlet to produce the fluid mixture, said mixing unit dispensing a predetermined volume of the fluid mixture from said mixture outlet wherein said mixing unit is configured to fill the fluid containment with the fluid mixture; and
   a control unit being coupled to said housing, said control unit being in electrical communication with said mixing unit, said control unit being manipulated by a user for determining the volume of the first chemical, the second chemical and the water, said mixing unit being actuated to mix the first chemical, the second chemical and the water according to the volume determined with said control unit.

2. The assembly according to claim 1, wherein said mixing unit comprises a control circuit being positioned within said housing, said control circuit receiving a dispense input, said control circuit receiving a shut off input.

3. The assembly according to claim 2, wherein said mixture unit comprises:
   a mixture valve being positioned within said housing, said mixture valve being electrically coupled to said control circuit, said mixture valve having a water input, a first chemical input, a second chemical input and a mixture output;
   said water input is fluidly coupled to said water inlet on said housing wherein said mixture valve is configured to receive the water;
   said first chemical input is fluidly coupled to said first chemical inlet wherein said mixture valve is configured to receive the first chemical;

said second chemical input is fluidly coupled to said second chemical inlet wherein said mixture valve is configured to receive the second chemical; and said mixture output is in fluid communication with each of said water input, said first chemical input and said second chemical input wherein said mixture output is configured to receive the fluid mixture thereby facilitating the fluid mixture to be dispensed from said mixture outlet.

4. The assembly according to claim 3, wherein said mixture unit comprises a flow sensor being integrated into said mixture valve, said flow sensor being electrically coupled to said control circuit, said flow sensor being aligned with said mixture output wherein said flow sensor is configured to sense the flow rate of the fluid mixture through said mixture output, said control circuit receiving said shut off input when said flow sensor senses that a pre-determined volume of the fluid mixture has flowed through said mixture output.

5. The assembly according to claim 4, wherein said mixture unit comprises a flow control valve being coupled to said mixture valve, said flow control valve being in fluid communication with said mixture output, said flow control valve being electrically coupled to said control circuit, said flow control valve modulating the volume of the fluid mixture released from said mixture output based on data from said flow sensor.

6. The assembly according to claim 5, wherein said flow control valve is actuated into an open condition when said control circuit receives said dispense input wherein said flow control valve is configured release the fluid mixture through said mixture output.

7. The assembly according to claim 5, wherein said flow control valve is actuated into a closed condition when said control circuit receives said shut off input.

8. The assembly according to claim 2, wherein said mixing unit includes a thermostat being integrated into said mixture valve wherein said thermostat is configured to sense the temperature of the fluid mixture, said thermostat being electrically coupled to said control circuit, said control circuit adjusting a ratio of hot water and cold water from the water source to maintain the fluid mixture at a predetermined temperature.

9. The assembly according to claim 5, wherein said control unit comprises a dial being rotatably coupled to said housing such that said dial is accessible to the user, said dial being electrically coupled to said control circuit, said dial being rotatable between a minimum volume and a maximum volume, said flow control valve adjusting the total volume of the fluid mixture in accordance with the setting of said dial.

10. The assembly according to claim 2, wherein said control unit comprises an electronic timer being positioned in said housing, said electronic timer being electrically coupled to said control circuit, said electronic timer counting down a pre-determined duration of time, said control circuit receiving said dispense input when said electronic timer counts down the predetermined duration of time.

11. The assembly according to claim 2, wherein said control unit includes a plurality of control buttons, each of said control buttons being movably coupled to said housing such that each of said control buttons is accessible to the user, each of said control buttons being electrically coupled to said control circuit.

12. The assembly according to claim 11, wherein:
said assembly includes:
an electronic timer;
a flow control valve; and
a thermostat; and
said plurality of control buttons includes a time button, a flow amount button, a mixture balance button and a temperature button, said time button adjusting the duration of time counted down by said electronic timer, said flow amount button adjusting the flow rate facilitated by said flow control valve, said mixture balance button adjusting a ratio of the first chemical, the second chemical and the water, said temperature button adjusting the desired temperature of the fluid mixture.

13. The assembly according to claim 11, wherein said control unit includes a display being coupled to said housing such that said display is visible to the user, said display being electrically coupled to said control circuit, said display displaying indicia comprising operational parameters set by each of said control buttons.

14. A chemical mixture dispensing assembly for mixing a chemicals and water in a pre-determined ratio and dispensing a pre-determined volume of the mixture, said assembly comprising:

a housing having a water inlet, a first chemical inlet, a second chemical inlet, a water outlet and a mixture outlet, said housing being mountable on a support surface such that said housing is positioned proximate a fluid containment;

a water hose being fluidly coupled between said water inlet and a water source wherein said water hose is configured to deliver water to said housing;

a first chemical hose being fluidly coupled between said first chemical inlet and a first chemical source wherein said first chemical hose is configured to deliver a first chemical to said housing;

a second chemical hose being fluidly coupled between said second chemical inlet and a second chemical source wherein said second chemical hose is configured to deliver a second chemical to said housing;

a mixture hose being fluidly coupled between said mixture outlet and the fluid containment wherein said mixture hose is configured to deliver a fluid mixture to the fluid containment;

a mixing unit being positioned in said housing, said mixing unit being in fluid communication with said water inlet, said first chemical inlet and said second chemical inlet wherein said mixing unit is configured to receive the water, the first chemical and the second chemical, said mixing unit being in fluid communication with said mixture outlet, said mixing unit mixing a predetermined volume of fluid from said first chemical inlet and said second chemical inlet with a predetermined volume of water from said water inlet to produce the fluid mixture, said mixing unit dispensing a predetermined volume of the fluid mixture from said mixture outlet wherein said mixing unit is configured to fill the fluid containment with the fluid mixture, said mixing unit comprising:

a control circuit being positioned within said housing, said control circuit receiving a dispense input, said control circuit receiving a shut off input;

a mixture valve being positioned within said housing, said mixture valve being electrically coupled to said control circuit, said mixture valve having a water input, a first chemical input, a second chemical input and a mixture output, said water input being fluidly coupled to said water inlet on said housing wherein said mixture valve is configured to receive the water, said first chemical input being fluidly coupled to said first chemical inlet wherein said mixture valve is configured to receive the first chemical, said second chemical input being fluidly coupled to said second chemical inlet wherein said mixture valve is configured to receive the second chemical, said mixture output being in fluid communication with each of said water input, said first chemical input and said second chemical input wherein said mixture output is configured to receive the fluid mixture thereby facilitating the fluid mixture to be dispensed from said mixture outlet;

a flow sensor being integrated into said mixture valve, said flow sensor being electrically coupled to said control circuit, said flow sensor being aligned with said mixture output wherein said flow sensor is configured to sense the flow rate of the fluid mixture through said mixture output, said control circuit receiving said shut off input when said flow sensor senses that a pre-determined volume of the fluid mixture has flowed through said mixture output;

a flow control valve being coupled to said mixture valve, said flow control valve being in fluid communication with said mixture output, said flow control valve being electrically coupled to said control circuit, said flow control valve modulating the volume of the fluid mixture released from said mixture output based on data from said flow sensor, said flow control valve being actuated into an open condition when said control circuit receives said dispense input wherein said flow control valve is configured release the fluid mixture through said mixture output, said flow control valve being actuated into a closed condition when said control circuit receives said shut off input;

a thermostat being integrated into said mixture valve wherein said thermostat is configured to sense the temperature of the fluid mixture, said thermostat being electrically coupled to said control circuit, said control circuit adjusting a ratio of hot water and cold water from the water source to maintain the fluid mixture at a predetermined temperature;

a control unit being coupled to said housing, said control unit being in electrical communication with said mixing unit, said control unit being manipulated by a user for determining the volume of the first chemical, the second chemical and the water, said mixing unit being actuated to mix the first chemical, the second chemical and the water according to the volume determined with said control unit, said control unit comprising:

a dial being rotatably coupled to said housing such that said dial is accessible to the user, said dial being electrically coupled to said control circuit, said dial being rotatable between a minimum volume and a maximum volume, said flow control valve adjusting the total volume of the fluid mixture in accordance with the setting of said dial;

an electronic timer being positioned in said housing, said electronic timer being electrically coupled to said control circuit, said electronic timer counting down a pre-determined duration of time, said control circuit receiving said dispense input when said electronic timer counts down the predetermined duration of time;

a plurality of control buttons, each of said control buttons being movably coupled to said housing such that each of said control buttons is accessible to the user, each of said control buttons being electrically coupled to said control circuit, said plurality of control buttons including a time button, a flow amount button, a mixture balance button and a temperature button, said time button adjusting the duration of time counted down by said electronic timer, said flow amount button adjusting the flow rate facilitated by said flow control valve, said mixture balance button adjusting a ratio of the first chemical, the second chemical and the water, said temperature button adjusting the desired temperature of the fluid mixture; and a display being coupled to said housing such that said display is visible to the user, said display being electrically coupled to said control circuit, said display displaying indicia comprising operational parameters set by each of said control buttons; and a power cord being coupled to and extending away from said housing, said power cord being electrically coupled to said control circuit, said power cord having a distal end with respect to said housing, said distal end having a male plug being electrically coupled thereto, said plug being pluggable into a power source comprising a female electrical outlet.

\* \* \* \* \*